(12) United States Patent
Hurley

(10) Patent No.: US 6,205,474 B1
(45) Date of Patent: *Mar. 20, 2001

(54) ACCESS MECHANISM FOR PARALLEL STATUS UPDATE FOR MULTIPLE SERVERS

(75) Inventor: Peter Mason Hurley, Stow, MA (US)

(73) Assignee: Compaq Computer Corporation, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,066

(22) Filed: Apr. 14, 1998

(51) Int. Cl.[7] .................................................. G06F 15/16

(52) U.S. Cl. .......................................... 709/218; 709/203

(58) Field of Search .................................. 709/218, 203, 709/105, 201, 219

(56) References Cited

U.S. PATENT DOCUMENTS

| | | | |
|---|---|---|---|
| 5,530,852 | * 6/1996 | Meske, Jr. et al. | 395/600 |
| 5,548,724 | * 8/1996 | Akizawa et al. | 709/203 |
| 5,572,643 | * 11/1996 | Judson | 709/218 |
| 5,649,103 | * 7/1997 | Datta et al. | 709/203 |
| 5,774,660 | * 6/1998 | Brendel et al. | 709/201 |
| 5,812,776 | * 9/1998 | Gifford | 709/217 |
| 5,867,706 | * 2/1999 | Martin et al. | 709/105 |
| 5,974,445 | * 10/1999 | Pivnichny et al. | 709/203 |
| 6,012,090 | * 1/2000 | Chung et al. | 709/219 |
| 6,016,494 | * 1/2000 | Isensee et al. | 707/102 |
| 6,021,437 | * 2/2000 | Chen et al. | 709/224 |

* cited by examiner

Primary Examiner—Zarni Maung
(74) Attorney, Agent, or Firm—Ceasari & McKenna

(57) ABSTRACT

Techniques used in obtaining information in parallel from one or more server systems as requested by a client computer system are disclosed. Multiple requests for information from one or more server systems are made in parallel providing information to the client system asynchronously rather than using a sequential synchronous programming technique.

17 Claims, 10 Drawing Sheets

12a

42   DETAIL SUBSTEPS OF STEP 42

48 — BROWSER CREATES, IN THE PARENT WINDOW, AN "INVISIBLE" FRAMESET OF CHILD WINDOW FRAMES EACH HAVING AN ASSOCIATED URL.

50 — BROWSER ISSUES REQUESTS IN PARALLEL FOR INFORMATION FROM ONE OR MORE SERVER SYSTEMS FOR EACH URL ASSOCIATED WITH THE CHILD WINDOWFRAMES.

ACCESS MECHANISM FOR PARALLEL STATUS UPDATE FOR MULTIPLE SERVERS

BACKGROUND OF THE INVENTION

This invention generally relates to computer networks. More specifically, this invention relates to a method and apparatus for retrieving information in a computer network.

The wide spread use of computer systems has prompted the development of many types of computer networks which allow multiple computer systems to communicate with each other. One significant computer network that has recently become very popular is known as the Internet. The Internet grew out of the use of computers and networks and has since evolved into a very sophisticated worldwide network of computer systems.

For a network connection and communication between two computers to be established, the two computers must be able to "speak" a common language. In other words, the two computers must be able to understand or use a common communication protocol. On the Internet (i.e., Web), this common language is the "hypertext transfer protocol" (HTTP).

A user on a computer system typically accesses the Internet using a software application known as a "Web browser". Generally a Web browser is a client application (Web client) executing in a computer system that enables a network connection, via the Internet, to other computer systems. Typically, the Web browser establishes an Internet network connection with another computer system generally known as a "Web server". Generally, a Web client sends HTTP requests to a Web server that returns pages of information typically in the form of text displayed in a format known as "hypertext markup language" (HTML). The Web browser receives the information as HTML pages from the Web server. In turn, the Web browser interprets the information provided in any received HTML pages, and subsequently displays the information on the user's computer system or terminal.

To locate information in a network, an addressing mechanism is needed. To facilitate locating Web pages on a particular computer system in the Internet, HTTP and HTML use an addressing mechanism known as a "uniform resource locator" (URL) to identify an Internet resource. A URL typically includes a portion of the address specifying the Web server computer system and then a path on that Web server leading to the resource or a relevant directory for that resource.

Generally, Web pages may contain static and dynamic data. Generally static data is data on a page that remains the same regardless of who accesses the data or when it is accessed. More recently, Web pages include dynamic data which is data on certain portions of the page that is subject to change. For example, dynamic data includes displaying stock market statistics or other data that may change periodically.

In some applications a user on one computer system using the Internet may require access to several pieces of dynamically changing data on one or more different Web server computer systems. For example, a user's Web browser in a first computer system may be interpreting an HTML file which requires five pieces of dynamic information from five different Web servers also connected to the user's system via the Internet. For uses such as this, a technique is needed which provides the updated information as needed from the multiple server nodes.

One technique used is to have the user's browser sequentially and synchronously contact each server node and await information from each of the multiple servers. In other words, a Web client issues a first request for first information from a first Web server. The Web client synchronously waits for this information to be returned. Subsequently, the Web client issues a second request for second information from a second Web server, and so on, until all information has been received by the Web client.

This technique has a drawback of being a very lengthy process in which each server is contacted in serialized, sequential order. To request additional information from a subsequent server, the client first receives information as requested from the previous server. Depending upon the number of Web servers to be contacted for the pieces of dynamic information, the total amount of time to obtain this information and display it to a user is generally not acceptable for interactive use.

A second technique used when multiple pieces of dynamic information are to be gathered from servers on a network, such as the Internet, involves designing an application, such as a Web page, such that no piece of dynamic information is automatically obtained from a server system. In other words, a user manually selects each particular piece of dynamic information to be obtained rather than designing a Web page, as in the first technique, which automatically issues multiple requests serially for dynamic data. Using this second technique, the cost of obtaining dynamic information, in terms of computer time and resources, is incurred on an "as needed" basis based upon user selection. This is an improvement over the first technique in that the overhead is not automatically incurred. However, it is not suitable for use in all types of applications. Additionally, when multiple requests are made by a user for multiple pieces of dynamic data, the same sequential process of the first technique is used thereby incurring the same drawbacks of the first technique.

Thus there is required an efficient technique for obtaining information in a computer network, such as the Internet, in an automated fashion while minimizing the total amount of time and computer resources required to obtain the information.

SUMMARY OF THE INVENTION

In accordance with principles of the present invention, a technique is used for gathering information in a client-server system which takes advantage of the parallelism capabilities of a network browser. In accordance with one aspect of the invention is a method for providing information to a client system in a network. The method includes issuing requests for information, in parallel and using a network browser, to one or more server systems in a network, and subsequently returning the information to the client system.

Thus, there is provided an efficient technique for obtaining information in a computer network in an automated fashion while minimizing the total amount of time and computer resources required to obtain the information.

BRIEF DESCRIPTION OF THE DRAWINGS

The above mentioned and other features of the invention will now become apparent by reference to the following descriptions taken in conjunction with the accompanying drawings in which.

DESCRIPTION OF THE PREFERRED EMBODIMENT

Figure 1:
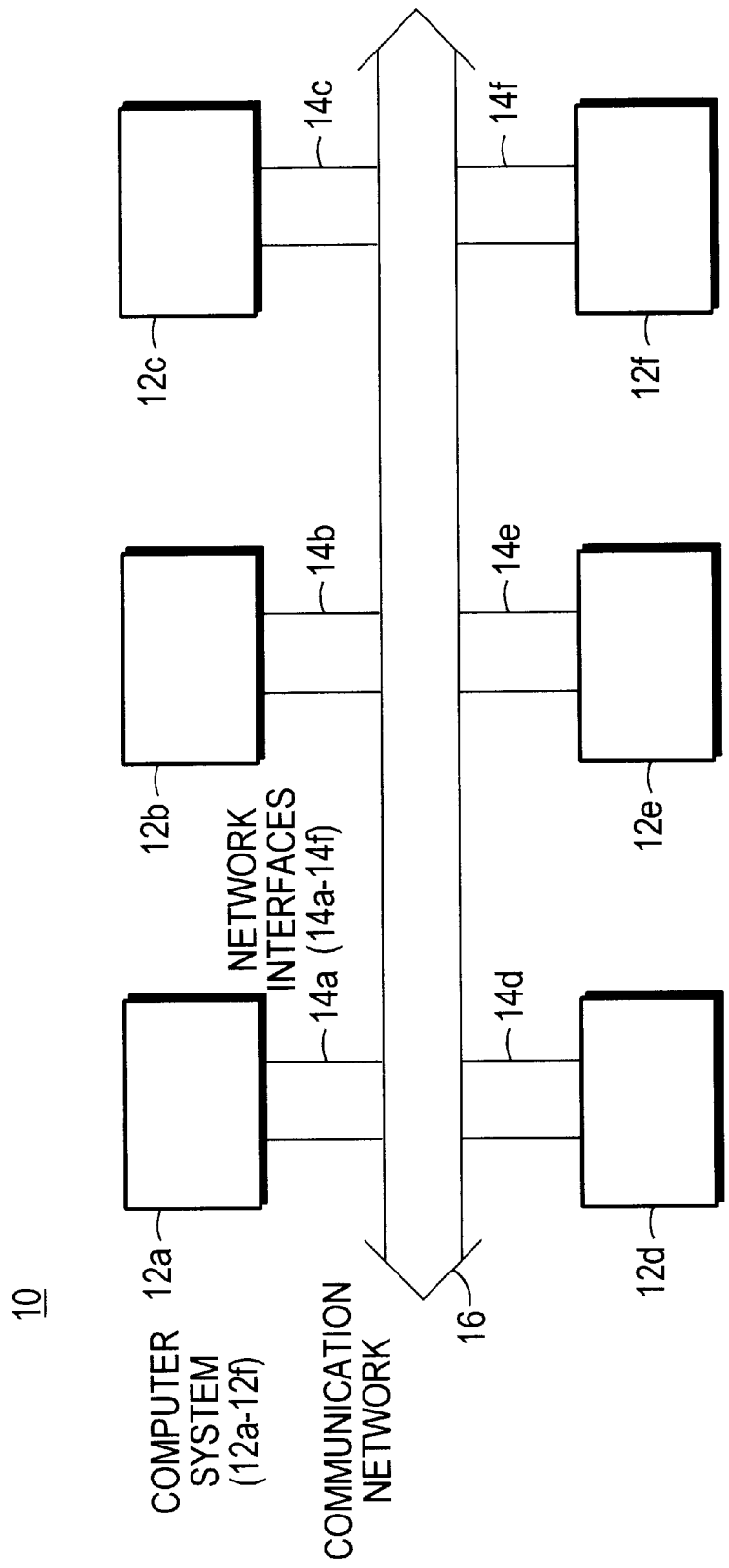
FIG. 1 is an example of an embodiment of a computer system.

Referring now to FIG. 1, an embodiment of a network 10 is shown to include a plurality of host computers, 12a–12f, connected by a communication network 16. Each of the computer systems 12a–12f interfaces with the communication network 16 via a network interface, respectively 14a–14f.

Each of the computer systems 12a–12f may be one of many different types of computer systems including, for example, a personal computer to a large mainframe operating as separate computer system in the network 10. Each of the computer systems 12a–12f communicates with another computer system within the network 10 using communication network 16.

It should be noted that a different number and arrangement of computer systems may exist in other preferred embodiments of the computer network 10.

Figure 2A:
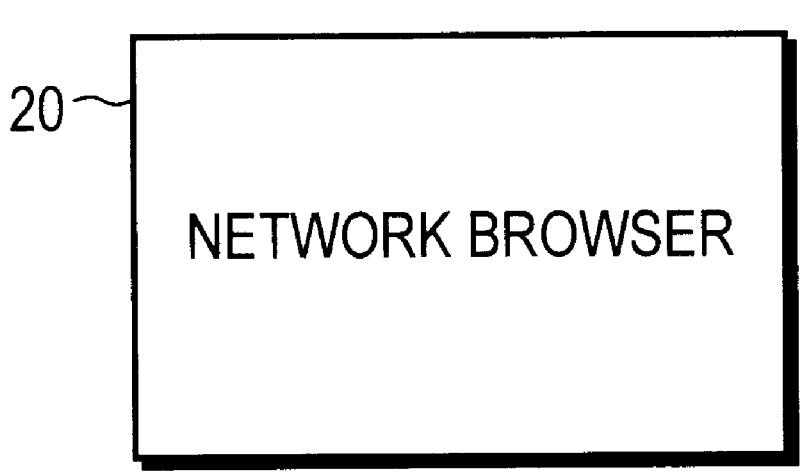
FIG. 2A is an example of a client computer system in a network of FIG. 1.

Referring now to FIG. 2A, shown is a process or task which is typically executing in a client system, as in node 12a of the computer network 10 of FIG. 1. FIG. 2A includes a network browser 20. In the description that follows, node 12a will be referred to as the client system, for example, in which a user typically invokes a windows programming application like a network browser 20, such as the Microsoft Internet Explorer or the Netscape browser. The client computer system 12a is a computer system that is usually serviced by one or more server computer systems also included in the network 10. In the preferred embodiment which will be described in paragraphs that follow, the network 10 is the World Wide Web (WWW) or Internet. It should be noted that in other preferred embodiments, different internets or intranets may also exist.

A user may execute a Windows application, such as network browser 20, to communicate with other Web sites, such as computer systems 12b–12f in the computer network 10. Generally a network browser 20 is software that interprets and presents hypertext mark-up language (HTML) documents to users of a computer system. A browser generally obtains, renders and displays data and other information to a user. Frequently, data items and files displayed by the network browser 20 reside on another computer in the network 10 other than the computer running the browser. It is at this point that the browser communicates with other computer systems in the computer system via computer network 16 to obtain required data and other information by sending information requests.

Generally, a document file received by the client system is an HTML document file that includes commands and other information. The commands are interpreted by the network browser 20 to perform certain operations and obtain certain pieces of data in accordance with commands included in an HTML file. Typically, the HTML files exist on a computer system other than the client 12a also in the network 10. However, in other preferred embodiments the HTML files may exist on the client computer system 12a.

One application which makes use of a network browser 20 is a status tool, as included in Alta Vista FORUM™ (AVF). Generally AVF is a collaboration product providing users, such as one executing web browser 20 in computer system 12a, status information from multiple server nodes, such as nodes 12b–12f of the network 10. AVF provides update and status information, for example, regarding electronic notes conferences. As known to those skilled in the art, an electronic notes conference is typically an electronic bulletin board which resides on a computer system in a network 10. Users enter replies and other forms of electronic text and documents in the notes conference. Subsequently, this information is communicated to other users of the notes conference. Thus, the notes conference serves as a means of communication between users of the notes conference in which the users may reside on different computer systems, such as 12a–12f in the network 10.

Using the AVF product, a user of a notes conference invokes the network browser 20 to provide status information as to various notes conferences in which the user participates. Status information may include, for example, how many new notes and replies have been entered since the user last accessed the notes conference. The various components of the AVF product and where they reside will be described in paragraphs that follow.

Figure 2B:
FIG. 2B is an example of software located on a host computer system in the computer network of FIG. 1.

Referring now to FIG. 2B, shown is an example of an embodiment of the software included on an AVF host system. In this description, the AVF host system is node 12b of the network 10. Located on the node 12b is the FORUM client software 24. Generally the FORUM client software 24 includes various software components which allow a client, such as browser 20 executing in computer system 12a as shown in FIG. 2B, to access necessary notes conference status information. Typically, the FORUM client software 24 includes HTML files which are downloaded to the client system, such as node 12a, for execution or interpretation, for example, by network browser 20 to provide the necessary status information to the client.

It should be noted that other preferred embodiments may include other software in the FORUM client software 24 to be used in conjunction with, or as a replacement for, the previously described HTML files. Additionally, the FORUM client software 24 may include generated and/or non-generated software, which varies with implementation. Generally, generated software is that which is dynamically produced or generated when needed. In contrast, non-generated software is static, and generally stored and retrieved when needed rather than being produced dynamically. In our embodiment, the HTML files, as included in the FORUM client software 24, are non-generated HTML files.

It should also be noted that although the FORUM client software 24 is located on a AVF host system 12b which is a different computer system than the client system 12a, in other preferred embodiments, nodes 12a and 12b may be the same computer system.

Figure 3:
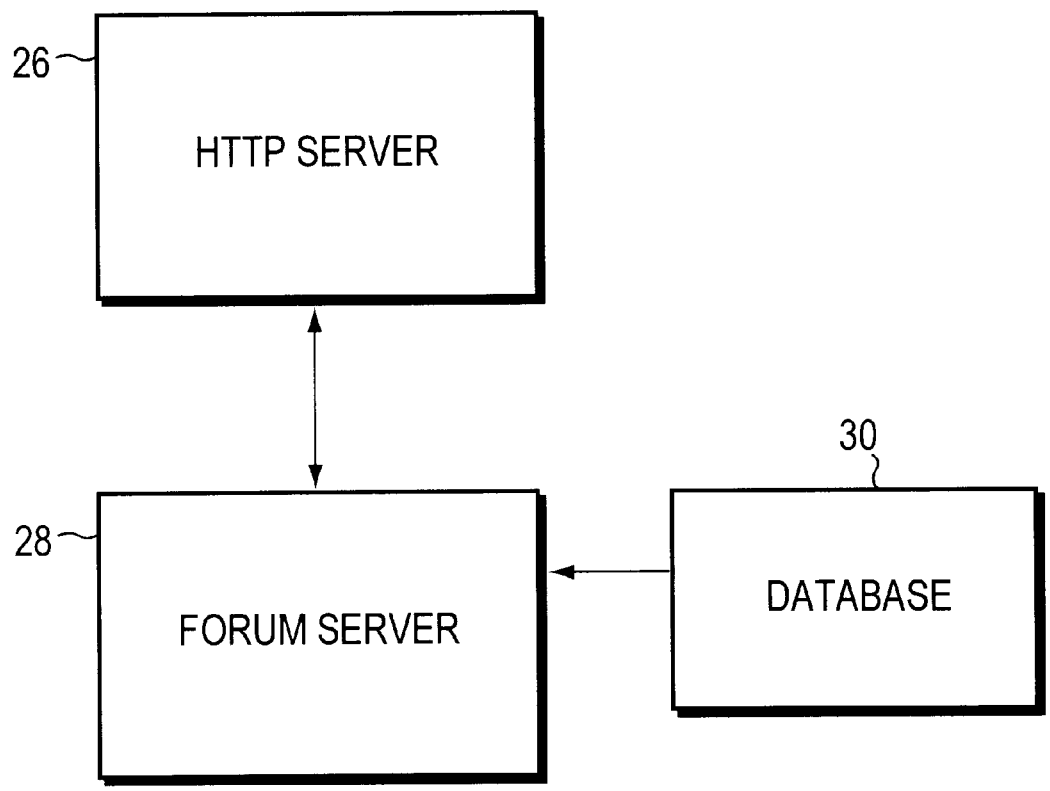
FIG. 3 is an example of the processes executing in a server system of the network of FIG. 1.

Referring now to FIG. 3, shown is an example of an embodiment of the software which executes on the various server systems, such as 12c–12f, which provide various status information to the client system, such as node 12a. In this preferred embodiment, nodes 12c–12f each contain at least one notes conference to which a user identifier associated with the user of browser 20 is a member or participant. In other preferred embodiments, each server may contain a varying number of conferences or other resources requested by the client system. Each of these server systems 12c–12f, which is a server with respect to the AVF product, includes an HTTP server 26, a FORUM server 28, and a database 30. Generally, the HTTP server 26 is software that communicates over the communication medium with other software applications, such as the network browser 20 of FIG. 2A executing in the client system.

Typically, a data request is made by client system through the network browser 20. This data request is communicated over communication network 16 to other various server systems, such as 12c–12f, which include an HTTP server 26. In turn the HTTP server 26 communicates with other server components of the AVF product.

It should be noted that in this particular embodiment, the communication medium 16 is the Internet or WWW. Accordingly, the server system includes an HTTP server 26 since this is the communications protocol typically associated with the Internet. If another network or intranet is included in another preferred embodiment, the server on the server systems may not be an HTTP server. This varies with the particular configuration and embodiment.

As shown in FIG. 3, the AVF product also includes a FORUM server 28 located on each of the server systems 12c–12f. Generally the FORUM server 28 is software invoked by the HTTP server when the HTTP server recognizes that a request has been made for a notes conference whose status is provided by the AVF product. As known to those skilled in the art, one mechanism by which the HTTP server invokes or recognizes that a request has been made for the FORUM server 28 is through the use of dispatch tables or other call-back mechanisms in accordance with implementation. Generally, these mechanisms invoke a particular executable image on the server system 12c in accordance with specific information communicated to the FORUM server 28 in the data request from the client system 12a. In this preferred embodiment, the FORUM server retrieves information from the data base 30 and returns information to the HTTP server 26. The HTTP server, in turn, communicates the information to the network browser 20 in the client computer system 12a using the communication network 16.

Information provided by the FORUM server 28 may be generated or non-generated information. Typically, non-generated information is information supplied by performing, for example, a database look-up and returning information stored in one or more records of the data base 30. In contrast, generated information is information supplied which is, for example, dynamically generated based on parameters communicated to server system 12c from client system 12a for the particular data request. In other words, rather than return a copy of a record from database 30 (non-generated information), data may be obtained from database 30 in accordance with a parameters included in a data request. Subsequently, the FORUM server 28 dynamically generates a data file such as an HTML file to perform certain commands based on the data obtained from database 30. In one preferred embodiment, this data generation may be done each time a data request is made from a client system such as 12a.

As known to those skilled in the art, when using the Internet as a communication network 16, resources are located on each of the various nodes and identified by a uniform resource locator (URL). Generally, a URL specifies an Internet location of a Web document such as an HTML document. A URL may be analogous to an electronic mailing address of an Internet resource, such as an HTML file. A URL has a predetermined format or syntax specifying an Internet protocol (IP) address and the various machine executable image or data file being accessed on a particular node or computer system with the specified IP address. An example of a URL is:

http://nodename.com/file_to_access in which "nodename" is the name of the computer system to which the request is made, and "file_to_access" is, for example the name and location of the HTML to be sent to the requesting client system.

Additional information, such as commands, arguments, and the notes conference name in this particular embodiment may be passed as additional parameters in the URL which are ignored by some software components, such as the HTTP server, and further passed on to other pieces of software such as the FORUM server. In other words, there are portions of the formatted URL which contain information interpreted by different pieces of software, such as servers. Other portions of the URL are passed to subsequent pieces of software, such as the FORUM server 28, to be used locally by the application being invoked on a various server system. For example, the above URL may be modified to include an appended string on the right-hand side. The string includes arguments which are not processed by the HTTP server, but are included in the data passed to other software on, for example, the client system. The URL may be:

http://nodename.com/file_to_access#arg1, arg2, . . .

in which the "#" and data to the right is processed by other software on the client system and not interpreted when fetching a particular data file in accordance with the other URL information. This will be described in more detail in paragraphs that follow, in particular with reference to FIG. 9.

Figure 4:
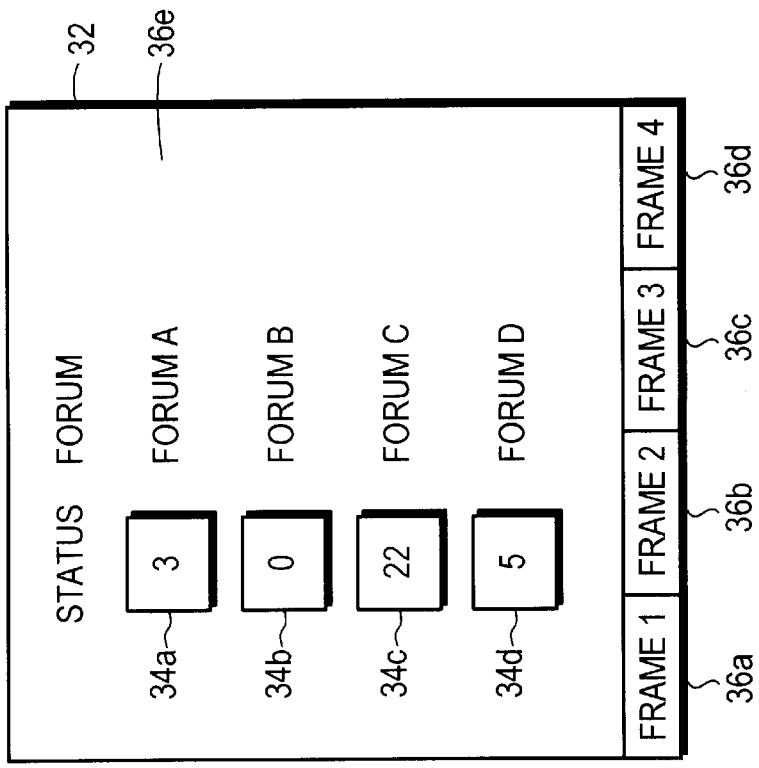
FIG. 4 is an example of a status page as displayed on a display device in the client's system of FIG. 1.

Referring now to FIG. 4, shown is an example of an embodiment of a status page as displayed on a display device when executing network browser 20 in computer system 12a of the network 10. Execution of the network browser 20 causes a status page 32 to be displayed on a display device. The status page provides update or status information on various notes conferences or forums in which a particular user participates. In this example, status page 32 includes an upper portion 36e providing status information on four notes conferences or forums. The notes conferences or forums are identified on the right-hand side of status page 32 as FORUMS A through D. Corresponding status information is displayed on the left-hand side of status page 32, as identified by elements 34a–34d, respectively, for each of the corresponding notes conferences. Included at the bottom of the display page 32 are four frames, 36a–36d. Each of these frames may be viewed as a child frame or sub-frame with a child/parent relationship with the remainder 36E of the status display window 32. In other words, frames 1 through 4 (36a–36d) have a parent window or a parent frame 36e. As will be described in paragraphs that follow, each of the frames 36a–36d is responsible for updating a corresponding portion 34a–34d, respectively, of the status page located in the parent frame 36e.

It should be noted that although frames 1 through 4 (36a–36d) are shown as being visible in FIG. 4, in a preferred embodiment these child frames may be "invisible" by having a height of zero such that no child frames 36a–36d are displayed on the status window to a user.

Figure 5:
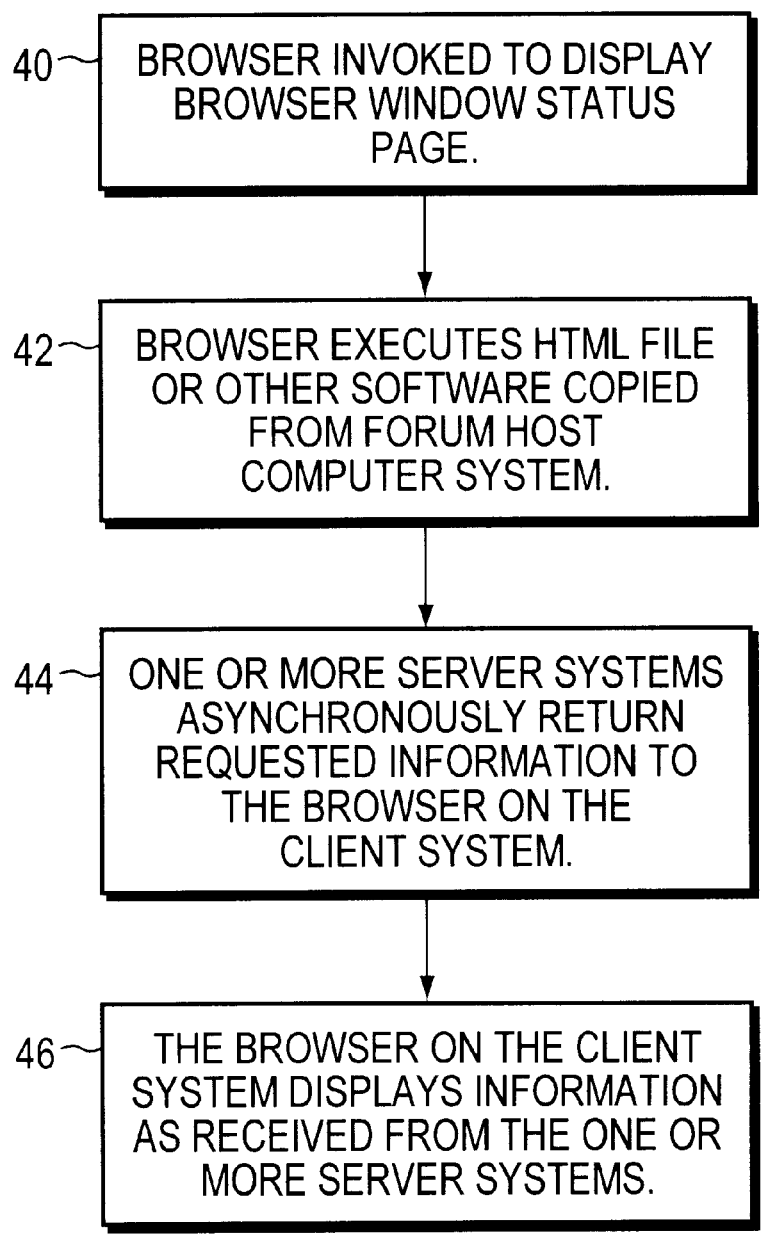
FIG. 5 is a flowchart depicting method steps of one embodiment as executed by the client system in FIG. 1.

Referring now to FIG. 5, shown are the method steps of one embodiment of a method executed in a client system 12a for a user to obtain the status display page as shown in FIG. 4. The method of FIG. 5 generally issues requests for necessary information to supplied about the various notes conferences or forums. At step 40, a browser is invoked to display the browser window status page. When this occurs, the browser executes an HTML file copied from an AVF host computer system having the client software at step 42. With reference to prior figures, the network browser 20 located on computer system 12a of FIG. 2A, is invoked and retrieves from the FORUM client software 24 resident in the AVF host system 12b. Included in this FORUM client software is the HTML file which is interpreted by the network browser 20 to display a status page 32 such as shown in FIG. 4.

At step 44, subsequent to the HTML file being copied and interpreted by the browser, one or more server systems asynchronously return requested information to the client system. With reference to prior descriptions and figures, the one or more server systems (12c–12f) return information to the client system 12a when the network browser 20 interprets the HTML file copied from the AVF host computer system 12B. In step 46, the browser on the client system displays information as received from the one or more server systems. It should be noted that in step 44, one or more server systems asynchronously return requested information. Accordingly, the browser on the client system displays this information as it is received from the one or more server systems. For example, regarding status display page 32 from FIG. 4, if four requests for information were issued to four different nodes in the network 10, each of them would return different information as to the status of the various notes conferences or forums accessed by the particular user. As each node or computer system returns information regarding a particular notes conference, the display page 32 is accordingly updated.

Figure 6:
FIG. 6 is a flowchart of an embodiment of more detailed substeps of step 42 from FIG. 5 in which the browser interprets an HTML file copied from a FORUM host computer system.

Referring now to FIG. 6, shown is an example of an embodiment of the detailed substeps of step 42 from FIG. 5 in which the HTML file(s) copied from the AVF host computer system are interpreted by the network browser 20. Commands included in the HTML file as interpreted by the browser cause the browser to perform the method steps 48 and 50.

Referring now to step 48, the browser creates in the parent frame an invisible frame set of child window frames each having an associated URL. An example of these child window frames of step 48 are described in preceding paragraphs referring back to frames 1–4 (36a–36d) of FIG. 4. Each of frames 1 through 4 (36a–36d) has an associated URL, as specified in commands included in the HTML files. Interpretation of these particular HTML commands by the browser causes the browser to issue, as in step 50, requests in parallel for information from the one or more server systems for each URL associated with the child window frames. Each URL designates a resource on a corresponding one of the server systems (12c–12f). Each server system returns requested information asynchronously which is subsequently displayed on the status display page 32 of FIG. 4, as per previously described step 44.

It should be noted that step 50 makes use of the parallelism capability typically available in a network browser. The network browser can make multiple information requests from one or more servers simultaneously by taking advantage of the characteristics of the frame feature typical of an HTML file as executed by a network browser. As known to those skilled in the art, to accomplish the same effect, an alternate implementation also taking advantage of the parallelism capability in a network browser includes having multiple embedded Applets in the HTML code being executed in a single window or frame. Generally, Applets are portions of executable code or script which are executed in a user's system when the user is executing an HTML file located on another server system.

Figure 7:
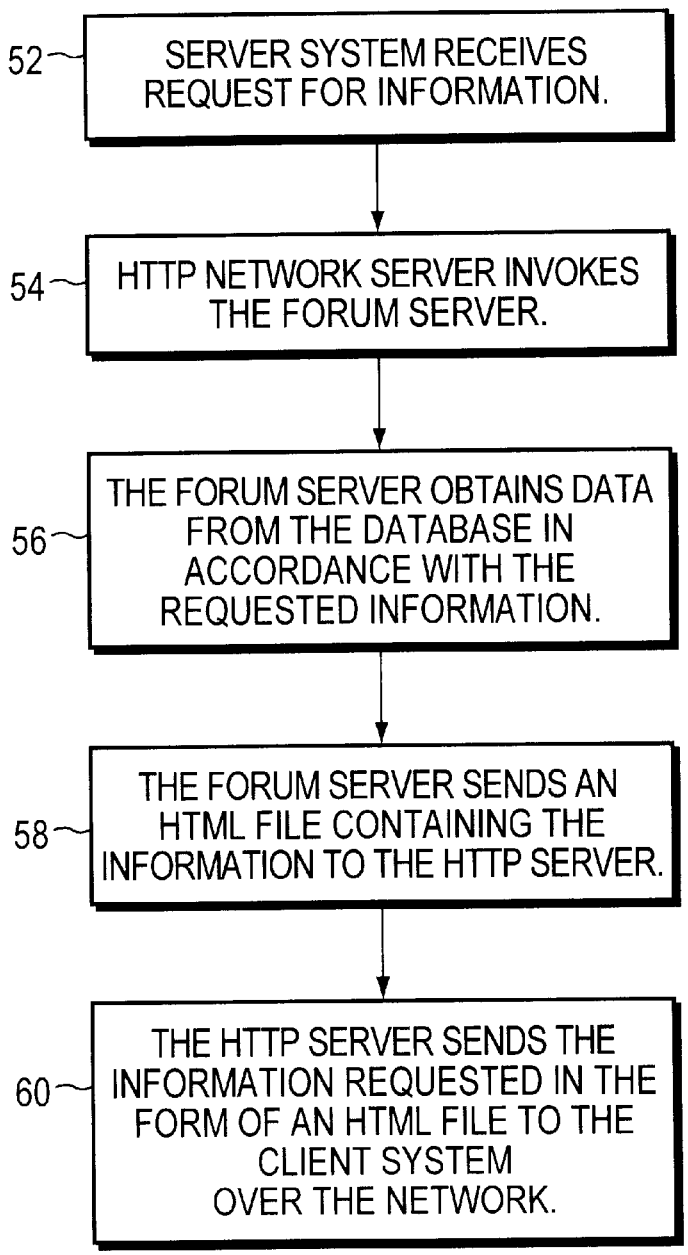
FIG. 7 is a flowchart of an embodiment of a method performed on a server system of FIG. 1 to which a request for information is sent by the client system.

Referring now to FIG. 7, shown is a flowchart of an embodiment of a method performed on a server system to which a request for information is sent by the client system. The method step depicted in FIG. 7 are typically executed on a server system, such as 12c–12f, with reference to the previously described embodiment. In step 52, a server system receives a request for information as sent by a client computer system. In step 54, the HTTP network server invokes the FORUM server. Recall that both the HTTP network server and FORUM server were shown and described in conjunction with FIG. 3. At step 56, the FORUM server obtains data from the database in accordance with the requested information. At step 58, the FORUM server sends an HTML file containing the information requested to the HTTP server. Recall, as previously described, that the HTML files returned to the HTTP server from the FORUM server in step 58 may be generated or non-generated files based on information from the database 30. At step 60 the HTTP server communicates this returned information requested in the form of an HTML file to the client system over the communication network 16.

Figure 8:
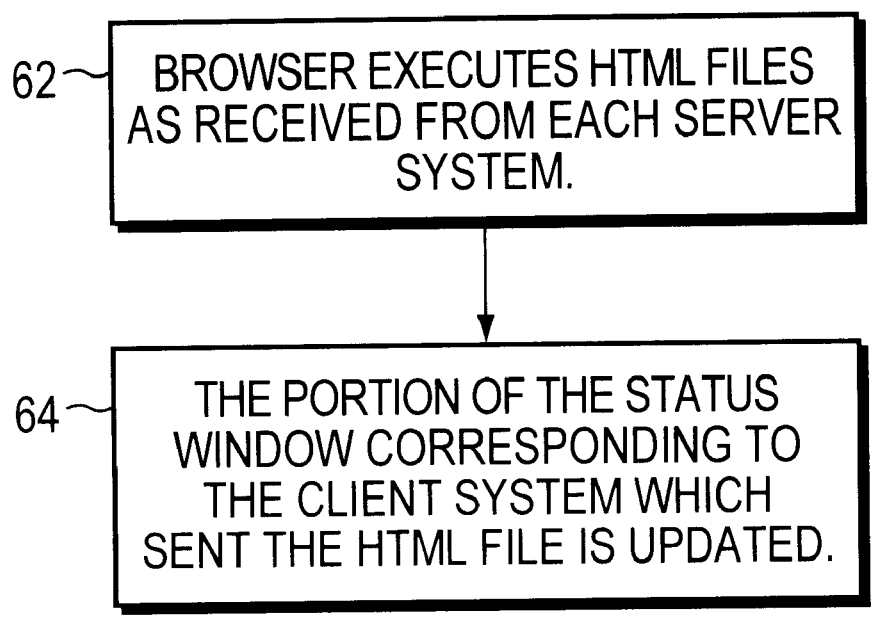
FIG. 8 is a flowchart of a first alternative embodiment of a method depicting more detailed substeps of step 46 from FIG. 5.

Referring now to FIG. 8, shown is a flowchart of a first preferred embodiment of a method showing more detailed substeps of step 46 of FIG. 5 in which the browser on the client system displays information received from one or more server systems. The method steps of FIG. 8 update status display information by executing HTML commands returned to the client system from the one or more server systems. Referring now to step 62, the browser executes the HTML files as received from each server system. At step 64, the portion of the status window corresponding to the client system which sent the HTML file is updated. Referring back to FIG. 4, each of the child window frames 36a–36d corresponds to a particular status box, 34a–34d respectively. Thus when information is received by the client system, for example, as designated by the URL associated with frame 1 36a, the status box 34a is accordingly updated.

Figure 9:
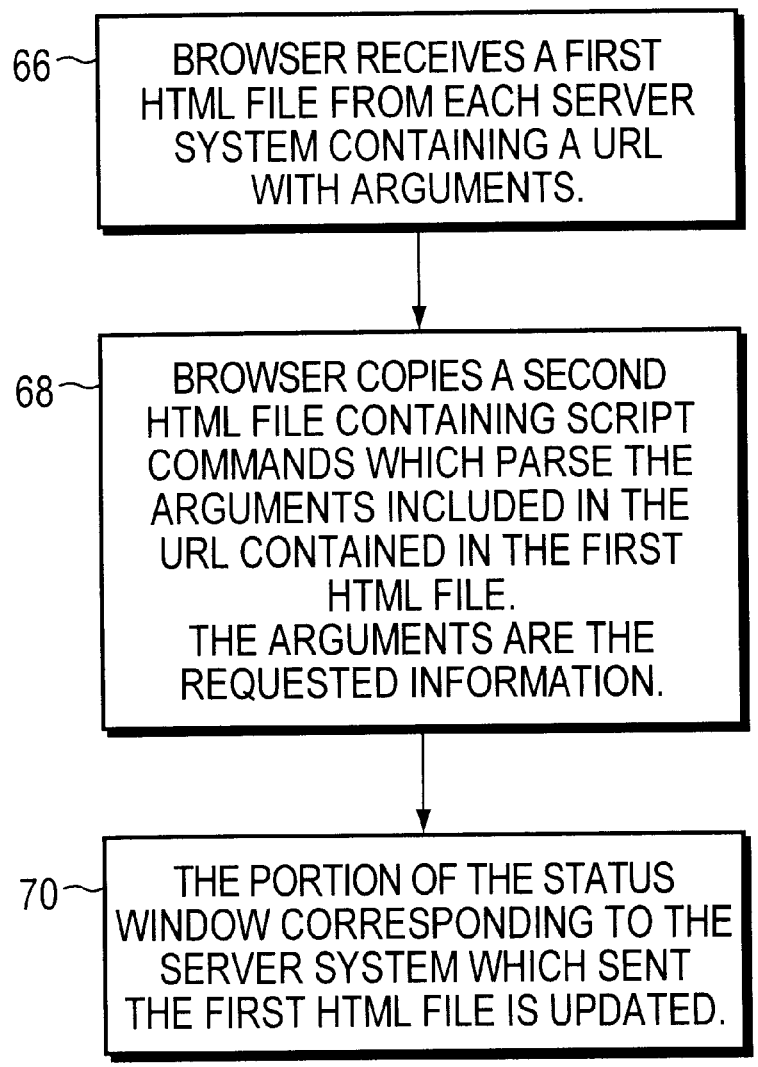
FIG. 9 is a flowchart of a second alternative embodiment of a method of more detailed substeps of step 46 from FIG. 5.

Referring now to FIG. 9, shown is a flowchart of a second preferred embodiment of a method of more detailed substeps of step 46 of FIG. 5. Generally the steps of FIG. 9 depict a method of updating the status window in which the HTML file received by each client system specifies a URL of a second HTML file with local arguments.

In step 66, the browser receives a first HTML file from each server containing commands specifying a URL of a second HTML file with other local arguments, as previously described. At step 68, the browser copies the second HTML file which contains script commands that parse the arguments included in the URL returned in step 66. The arguments are the requested information. At step 70, the portion of the status window corresponding to the server system which sent the first HTML file is accordingly updated.

Generally at step 68 execution of the second HTML file results in parsing the URL contained in the first HTML file to remove those local arguments included in the URL which are the requested information. This requested information is accordingly displayed as a result of Step 70 of FIG. 9.

In this preferred embodiment, the second HTML file is non-generated and the same file may be used for each of multiple requests that are made (i.e., when the method steps of FIG. 9 are executed multiple times). When such multiple requests are made, as a performance enhancement, browsers in a preferred embodiment may cache the second HTML file for subsequent use after the first time it is accessed and copied from system 12b to system 12a. Typically, browsers include this caching feature as a user selected option.

It should be noted that two alternate embodiments are given for performing step 46. This is due to the fact that in one particular implementation of the method steps of FIG. 8, the implementation does not work with all network browsers. Rather that particular implementation of the method steps of FIG. 8 worked properly only with the restriction that the AVF host system 12b was the same as the server system 12c–12f. If the AVF host system ever differed from the server system, such as 12c, the implementation would not execute properly. This is due to the fact that some network browsers, such as particular versions of the Internet Explorer, do not allow HTML code from one server running in a frame to execute a function residing in another frame that has HTML code from a different server. In other words to work properly, the URL of both the first and second frames must designate the same computer system. This will become more apparent to one of ordinary skill in the art by the sample HTML files provided in the following text. To overcome this restriction dependent upon particular system features, a preferred embodiment may alternatively use the method steps of FIG. 9.

In following text are three sample HTML files: Pat__0, Pat__1, and Pat__2 which contain various HTML commands to implement the method steps of FIG. 8. With reference to the previously described embodiment, files Pat__0, Pat__1, and Pat__blank reside on the AVF host system such as node 12b described in conjunction with FIG. 2B, and Pat__2 resides on one of the servers such as nodes 12c–12f.

Generally, Pat__0 displays the parent frame which includes creating two child frames, each of which is associated with an HTML file Pat__1, and Pat__2, respectively. Interpretation of Pat__0 by the browser causes two requests to be issued to the AVF host systems, as designated in the URLs specifying Pat__1 and Pat__2 (see FRAME SRC command below). These HTML files are subsequently copied to the client system from the AVF host system and executed in the client system. Interpretation of Pat__1 causes a button to be displayed which, when activated by the user as by a right mouse click, causes HTML file Pat__2 to be copied from the designated server system to the client system. Pat__2 is then executed on the client system updating a portion of the parent window frame. Pat__0 also includes a second request for Pat__2 to be copied from the server system and executed on the client system. This second request is an automatic direct request in the file Pat__0, as opposed to waiting for user selection, as in the previously description of Pat__1.

```
File Pat_0:
<HTML>
<HEAD><TITLE> Frame Example 1 </TITLE>
<SCRIPT LANGUAGE="JavaScript">
<!--
////////////////////////////////////////////////////
//
// Demonstration of retrieving data from multiple servers
// as directed from the client browser.
//
// This page is the parent frameset. It is initially loaded
// from any available server.
//
// Parent javascript functions are included here.
//
////////////////////////////////////////////////////
function list() {
}
var answer = ";
var number = 0;
var timeId = null;
function storeData1() {
    pat1.document.pat1form.pat1text.value = answer;
    timeId = setTimeout('storeData1()',1000);
}
timeId = setTimeout('storeData1()',1000);
<!-- end script -->
</SCRIPT>
</HEAD>
<FRAMESET ROWS="60%,40%">
    <FRAME SRC="http://AVF_HOST/pat1.htm" NAME="pat1">
    <FRAME SRC="http://AVF_HOST/pat2.htm" NAME="pat2">
</FRAMESET>
</HTML>
File Pat_1:
<HTML>
<HEAD><TITLE> Frame Example 1 </TITLE>
<SCRIPT LANGUAGE="JavaScript">
<!--
function launchUrl() {
    parent.pat2.location ='http://SERVER/pat2.htm';
    parent.number++;
}
<!-- end script -->
</SCRIPT>
</HEAD>
<body>
<h2>Display Frame</h2>
This frames displays data received from the other servers.
<p>
<form name=pat1form>
<input type=text name=pat1text size=60>
<br>
<br>
<br>
<input type=submit value='Click here to fetch the current date and time.' onClick='launchUrl()'>
</form>
</body>
</HTML>
File Pat_2:
<HTML>
<HEAD><TITLE> Frame Example 1 </TITLE>
<SCRIPT LANGUAGE="JavaScript">
<!--
var today = new Date();
var s ='The data gatherer computes today to be:';
s += today.getMonth() + 1;
s += '/';
s += today.getDate();
s += '/';
s += today.getYear() + 1900;
s += ' '
s += today.getHours();
s += ':';
s += today.getMinutes();
s += ':';
s += today.getSeconds();
// Store the answer up onto the parent's page
```

```
self.parent.answer = s;
<!-- end script -->
</SCRIPT>
</HEAD>
<body>
<h2>Data Gatherer</h2>
This frame gathers the desired data and returns it to be displayed.
<p>
In this example, the URL loaded in this frame built a string containing
today's date and returned it to be displayed.
</body>
</HTML>
```

In following text included are five files: Pat_10, Pat_11, Pat_12, Pat_13, and Pat_blank which implement the method steps of FIG. 9 without the restriction previously described in conjunction with FIG. 8. Generally Pat_10, Pat_11, Pat_13 and Pat_blank reside on the AVF host system such as node 12b previously described, and the file Pat_12 resides on one of the server systems, such as nodes 12c–12f.

Generally, interpretation of Pat_10 by a browser creates the parent window and two child frames associated with two HTML files Pat_11 and Pat_blank. Requests are issued to the AVF host system for these HTML files which are copied to, and interpreted in, the client system. Interpretation of Pat_11 causes a button area to be displayed similar to that as displayed when Pat_1 is interpreted. When the button area is activated, as by a right mouse button click, a request for Pat_12 is sent to the server system (Pat_12 is the first HTML file in step 66 of FIG. 9). Pat_12 is copied to, and interpreted in, the client system. It should be noted that Pat_12 includes DATE and TIME information. The server system supplies values for this information which is sent to the client system. Interpretation of Pat_12 causes a second request to be issued to the AVF host system to supply Pat_13. (Pat_13 is the second HTML file in step 68 of FIG. 9). Interpretation of Pat_13 causes the URL designating Pat_13 to be parsed. In a URL format similar to what was previously described, the requested information of date and time are included as values to the right of the "#" (hash) symbol in the URL designating Pat_13. Accordingly, the text area in the parent window is updated. The file Pat_blank in this example doesn't cause anything to occur. However, in a typical use as described with status window 32, Pat_blank is replaced with a file similar to Pat_11 causing execution of the method steps of FIG. 9.

```
File Pat_10:
<HTML>
<HEAD><TITLE> Frame Example 1 </TITLE>
<SCRIPT LANGUAGE="JavaScript">
<!--
//////////////////////////////////////////////////
//
// Demonstration of retrieving data from multiple servers
// as directed from the client browser.
//
// This page is the parent frameset. It is initially loaded
// from any available server.
//
// Parent javascript functions are included here.
//
// The mechanism used in this example is to pass the data
// received from a remote server as part of a URL, thus
// bypassing problems with inter-frame access permissions.
//
//////////////////////////////////////////////////
<!-- end script -->
</SCRIPT>
</HEAD>
<FRAMESET ROWS="60%,40%">
  <FRAME SRC="http://AVF_HOST/pat11.htm" NAME="pat11">
  <FRAME SRC="http://AVF_HOST/pat_blank.htm" NAME="pat12">
</FRAMESET>
</HTML>
File Pat_11:
<HTML>
<HEAD><TITLE> Frame Example 2 </TITLE>
<SCRIPT LANGUAGE="JavaScript">
<!--
function launchUrl() {
   var host = self.location.host;
   var path = self.location.pathname;
   path = path.substring(0, path.lastIndexOf('/'));
   parent.pat12.location = 'http://SERVER/pat12.htm#' + host + path;
}
function storeData1 (answer) {
   self.document.pat11form.pat11text.value = answer;
}
<!-- end script -->
</SCRIPT>
</HEAD>
<body>
<h2>Display Frame</h2>
This frames displays data received from the other servers.
<p>
<form name=pat11form>
<input type=text name=pat11text size=70>
<br>
<br>
<br>
<input type=submit value='Click here to fetch the current date
and time.' onClick='launchUrl()'>
</form>
</body>
</HTML>
File Pat_12:
<HTML>
<HEAD><TITLE>Frame Example 2 </TITLE>
<SCRIPT LANGUAGE="JavaScript">
<!--
var today = new Date();
var s = "";
s += today.getMonth() + 1;
s += ',';
s += today.getDate();
s += ',';
s += today.getYear() + 1900;
s += ',';
s += today.getHours();
s += ',';
s += today.getMinutes();
s += ',';
s += today.getSeconds();
// Send the answer back by launching a url on the original server and
passing
// the answer along in the 'hash' field
// First, get the url of the originator (from the hash field of our url)
var orgUrl = self.location.hash;
var orgLength = orgUrl.length;
orgUrl = orgUrl.substring(1,orgLength);
// Next, build the url to launch at the client
var url = 'http://' + orgUrl + '/AVF_HOST/pat13.htm#' + s;
self.location = url;
<!-- end script -->
</SCRIPT>
</HEAD>
<body>
</body>
</HTML>
File Pat_13:
<HTML>
<HEAD>
</HEAD>
<BODY>
```

-continued

```
<SCRIPT LANGUAGE="JavaScript">
function getNextField(str) {
        var nextField = str;
        var index = str.indexOf(',');
        if (index >= 0) {
            nextField = str.substring(0, index);
        }
        return nextField;
}
function cutNextField(str) {
        var newStr ="";
        var index = str.indexOf(',');
        if (index >= 0) {
            newStr = str.substring(index+1, str.length);
        }
        return newStr;
}
var hashValue = self.window.location.hash;
var index = hashValue.indexOf('#');
if (index >= 0) {hashValue = hashValue.substring(index+1,
hashValue.length)}
var day = getNextField(hashValue);
hashValue = cutNextField(hashValue);
var month = getNextField(hashValue);
hashValue = cutNextField(hashValue);
var year = getNextField(hashValue);
hashValue = cutNextField(hashValue);
var hours = getNextField(hashValue);
hashValue = cutNextField(hashValue);
var minutes = getNextField(hashValue);
hashValue = cutNextField(hashValue);
var seconds = getNextfield(hashValue);
hashValue = cutNextField(hashValue);
//Build the answer string
var s = "The data gatherer computed today's date as:"
s += day + '/' + month + '/' + year + " +
hours + ':' + minutes + ':' + seconds;
//Now, store the answer into the parent so it can be displayed
parent.pat11.storeData1(s)
<!-- end script -->
</SCRIPT>
<body>
<h2>Data Gatherer</h2>
This frame gathers the desired data and returns it to be displayed.
<p>
```

It should be noted that various aspects of the foregoing descriptions may vary with implementation of the principals of the invention. For example, depending upon the particular network browser 20 residing on a client system 12a, either of method steps of FIG. 8 or FIG. 9 may be used.

The foregoing description affords a flexible and efficient technique for providing status information for one or more server computer systems in a network 10 by making use of the parallelism capabilities as included in a standard network browser. As previously described, the standard network browser can request multiple URL's of multiple servers simultaneously by using the frame feature included in the HTML file as interpreted by the network browser. Although the previously described embodiment provided status information with regard to forum or notes conferences, the principals of the invention may be more generalized to gather any type of information taking advantage of the parallelism of the browser using the standard HTML language FRAME feature to fetch data in parallel from one or more server systems. It should also be noted that although the previously described embodiment includes one or more server computer systems in which each of the requests are made from different computer systems, an alternate embodiment may makes requests of the same server computer system since the servers are typically multi-threaded. In other words, the same server may be queried multiple times in parallel by a single client computer system. Also known to those skilled in the art are other parsing techniques for retrieving information encoded in the URL of the second HTML file.

It should also be noted as known to those skilled in the art that various portions of the Alta Vista Forum product, such as the FORUM client software 24 of FIG. 2B, may be implemented as a scripted language or a programming language. There are also various mechanisms, for example in the HTTP server, for invoking the appropriate software products on a server node which may vary with implementation. For example one version of an HTTP server may invoke a particular machine executable image for a particular request sent to a server computer system by placing the executable in a directory with a particular name. It should also be noted that the above files contained in the previous two examples function properly in accordance with Internet Explorer™ V4.0 and Netscape™ V4.0. Different versions and different configurations of software and hardware may require one skilled in the art to slightly modify the previously described files for working in a particular environment.

The foregoing description affords a flexible and efficient technique for gathering information by taking advantage of the parallelism capabilities of a browser using the standard HTML features for fetching data from various server computer system. By taking advantage of the parallelism available in a standard network browser. A more efficient alternative to sequential programming asynchronously waiting for each server system to return information exists.

Having described preferred embodiments of the invention, it will now become apparent to those skilled in the art that other embodiments incorporating its concepts being provided, it is felt that this invention should not be limited to the disclosed embodiment but rather should only be limited to the scope of the appended claims.

What is claimed is:

1. A method of providing information to a client system in a network, the network including one or more server systems, said method comprising the steps of:

issuing a plurality of requests for status information about a plurality of notes conferences to one or more of the server systems, said plurality of requests issued by means of a standard Hypertext Markup Language (HTML) language FRAME feature in a browser, said browser resident in the client system;

receiving one or more responses from the one or more server systems in response to said plurality of requests, each said response comprising at least a portion of the status information requested, said one or more responses received by said browser;

providing a parent frame in a display at the client system;

creating a frame set of child frames in said parent frame; and providing each said portion of status information to said display, each said portion of status information provided to said parent frame in a sequence as received from the one or more server systems, each said child window frame for updating a portion of said status information.

2. The method of claim 1, wherein the one or more server systems return said one or more responses asynchronously.

3. The method of claim 1, further comprising the steps of:

contacting a network server in a first of said one or more server systems simultaneously with or subsequent to said step of issuing a plurality of requests;

invoking a program in said first server system via said network server;

retrieving at least a portion of the information requested from said network server via said program; and returning at least one response to the client system, said at least one response comprising said retrieved information.

4. The method of claim 3, wherein said invoked program is identified by a program identifier included in a first of said plurality of requests sent to said first server system, said invoked program located in a directory identified by said program identifier.

5. The method of claim 3, wherein said step of retrieving at least a portion of the information requested from said network server comprises the step of:

retrieving data from a database via said program.

6. The method of claim 5, wherein said at least one response comprises said data from said database.

7. The method of claim 5 further including the step of:

producing, using said data from said database, a generated file; and returning said generated file to said network server to be further returned to said client system.

8. The method of claim 1, wherein one of said one or more responses received by said browser comprises a first command file, and said method further comprises the steps of:

executing said first command file in the client system; and updating said display in response to said step of executing said first command file.

9. The method of claim 8 further comprising the steps of:

receiving a second command file from a host system in said network subsequent to said step of updating said display;

executing said second command file in the client system; and further updating said display in response to said step of executing said second command file.

10. The method of claim 9, wherein one of said one or more server systems comprises said host computer system.

11. The method of claim 8, wherein each of said one or more child frames is associated with a corresponding command file located on a respective one of said one or more servers in the network.

12. The method of claim 11, wherein said child frames are not visible in said display.

13. The method of claim 1, wherein the network comprises a member of the group consisting of an intranet and the Internet.

14. The method of claim 1, wherein the client system comprises one of said one or more server systems.

15. The method of claim 14, wherein said client system further comprises a host computer system.

16. The method of claim 1, wherein one of said one or more server systems comprises a server system which executes the plurality of requests in a multithreaded environment.

17. The method of claim 1, wherein each of said plurality of requests comprises an identifier associated with a particular user name identifying a user of each of said plurality of notes conferences.

* * * * *